Aug. 14, 1923.

J. F. O'CONNOR 1,464,724

FRICTION SHOCK ABSORBING MECHANISM

Filed Aug. 7, 1922  2 Sheets-Sheet 2

Witnesses
Wm. Geiger

Inventor
John F. O'Connor
By Geo. I. Haight
His Atty

Patented Aug. 14, 1923.

1,464,724

UNITED STATES PATENT OFFICE.

JOHN F. O'CONNOR, OF CHICAGO, ILLINOIS, ASSIGNOR TO WILLIAM H. MINER, OF CHAZY, NEW YORK.

FRICTION SHOCK-ABSORBING MECHANISM.

Application filed August 7, 1922. Serial No. 580,010.

*To all whom it may concern:*

Be it known that I, JOHN F. O'CONNOR, a citizen of the United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanisms.

The object of the invention is to provide a friction shock absorbing mechanism especially adapted for railway draft riggings and wherein are obtained high capacity and large wearing areas.

Figure 1:
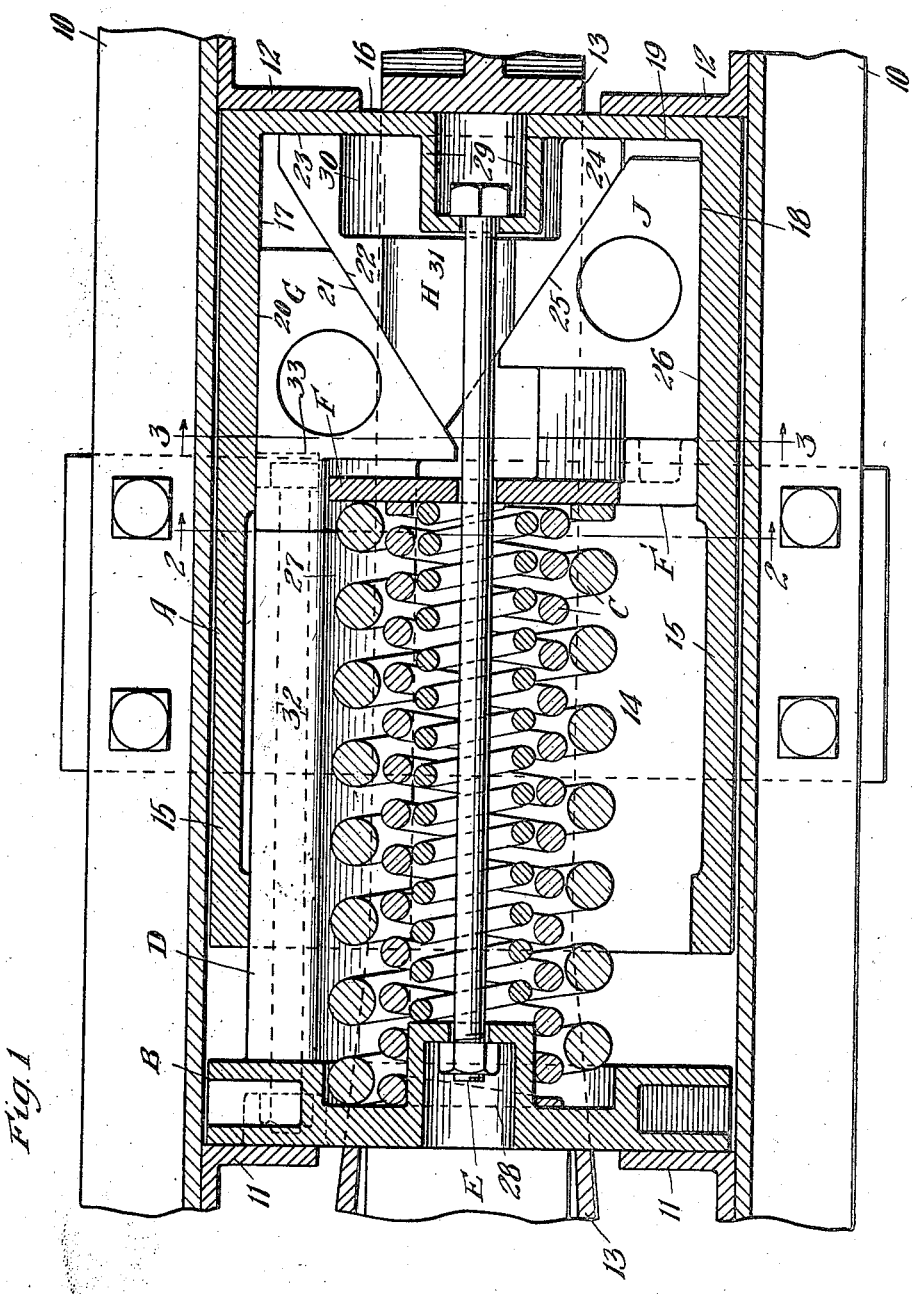
Figure 2:
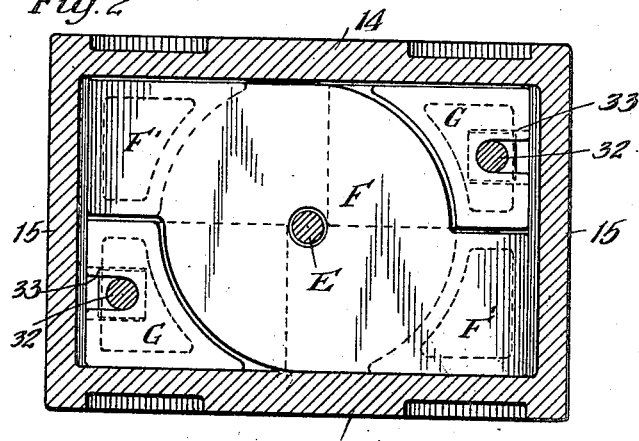
Figure 5:
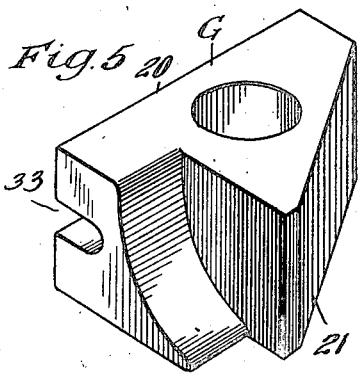
Figure 3:
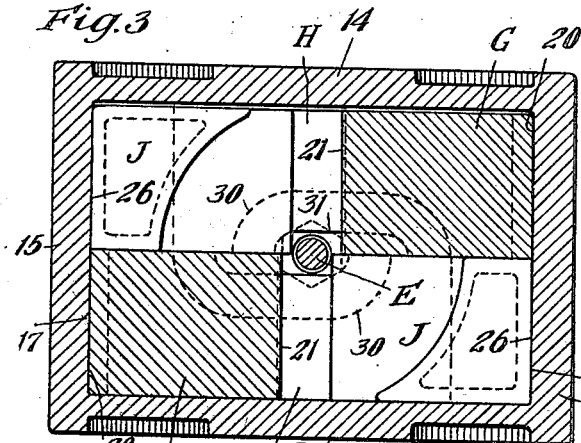
Figure 6:
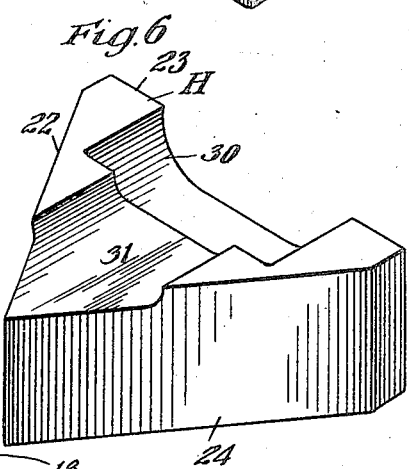
Figure 4:
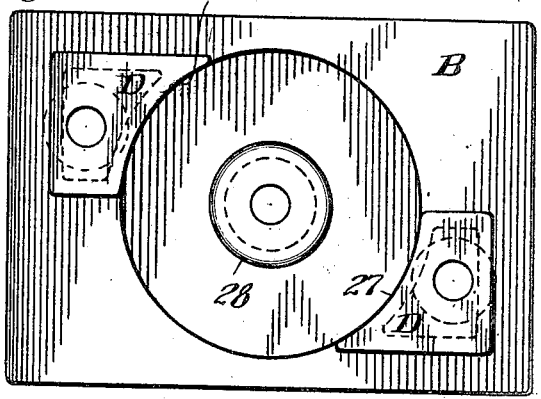

In the drawings forming a part of this specification, Figure 1 is a horizontal longitudinal sectional view of a portion of a railway draft rigging showing my improvements in connection therewith. Figures 2 and 3 are vertical transverse sectional views of the shock absorbing mechanism proper corresponding to the section lines 2—2 and 3—3 respectively of Figure 1. Figure 4 is a view of the inner face of the front follower employed in the mechanism, all other parts being removed. And Figures 5 and 6 are detail perspectives of two different wedge-friction-shoes employed in my arrangement.

In said drawings, 10—10 denote the usual channel draft sills of a car underframe, to the inner faces of which are secured front stop lugs 11 and rear stop lugs 12. The shock absorbing mechanism proper is operatively associated with the drawbar, not shown, by a hooded cast yoke 13.

The improved shock absorbing mechanism proper consists, broadly, of a friction shell and spring cage casting A; a front follower B; a spring resistance C; two pressure-transmitting plungers or columns D—D; a retainer bolt E; a spring follower F; and duplicate sets of friction devices, each set comprising three wedge-friction-shoes G, H and J.

The casting A, as shown, is of rectangular cross section having top and bottom walls 14—14, side walls 15—15, and rear back wall 16. At its rear or inner end, the side walls 15 provide longitudinally extending flat friction surfaces 17 and 18 and the back wall provides a transversely extending flat friction surface 19. The friction surfaces 17 and 18 extend for a distance slightly less than half of the total length of the casting A and forwardly thereof, the casting A provides a cage for the spring and plungers, hereinafter described.

Each set of friction devices, as hereinbefore explained, consists of three wedge-friction-shoes G, H and J, one set being disposed in the upper half of the shell and the other set in the lower half and with the three elements of the one set reversed with respect to the three elements of the other set. The wedge-friction-shoe G of each set has an outer friction surface 20 cooperable with a corresponding longitudinal shell friction surface 17 or 18, as the case may be. Each wedge-shoe G also has a wedge face 21 cooperable with a wedge face 22 on the intermediate element H. The latter, at its rear end, has a transversely extending friction surface 23 cooperable with the transverse shell friction surface 19. On the other side of its center, the element H has a wedge-friction surface 24 cooperable with a corresponding wedge-friction surface 25 of the element J. The latter has an outer longitudinally extending friction surface 26 cooperable with the corresponding shell friction surface 17 or 18, as the case may be.

Two pressure-transmitting columns or plungers D are employed, the same being arranged diagonally within the casting A, as best shown in Figure 4. The columns D, as shown, are made integral with the front follower B although, as will be evident to those skilled in the art, said columns may be made separate from the follower. Each column D fits within a corner of the casting A and has an inner rounded face 27 adapting it to accommodate the coil spring C. At their inner ends, the columns D bear upon the diagonally disposed wedge-friction-shoes G so that, upon relative approach of the casting A and follower B, the wedge-friction-shoes G will be forced longitudinally inwardly of the friction shell. As the diagonally disposed wedge-friction-shoes G are thus actuated with respect to the friction shell, the respective wedge-friction-shoes H will be moved transversely of the shell and in opposite directions, thereby generating friction on the friction surfaces 19 and 23. As the wedge-friction-shoes H move transversely, they in turn force the corresponding wedge-friction-shoes J longitudinally outwardly of the friction shell.

The three-coil spring C is seated at its front end over a hollow cup-shaped boss 28 and at its rear end, said coils bear upon the follower F. Said follower F, as best shown in Figure 2, is formed with a central circular or disc-like section and two diagonally opposite lateral extensions F'—F', working in the diagonally disposed corners of the shell. As the two wedge-friction-shoes J are moved outwardly of the shell, as previously described, they engage said lateral extensions F' of the follower F and force it in the same direction so that, upon relative approach of the casting A and follower B, said spring C is compressed from both ends simultaneously.

The retainer bolt E is anchored at its forward end within the cup-shaped boss 28 and at its rear end in a similar cup-shaped boss 29 formed integral with the rear wall 16 of the casting A. The two wedge-friction-shoes H are suitably transversely recessed as indicated at 30 in Figure 6 to clear the boss 29 and permit free transverse movement of said elements H. Said elements H are also suitably transversely recessed as indicated at 31 for a similar purpose with respect to the retainer bolt E.

To hold the pressure-transmitting columns D and the wedge-friction-shoes G rigid with the follower B, I employ longitudinally extending bolts 32 which are anchored at their front ends within suitable sockets in the follower B and at their inner ends in suitable undercut slots 33 provided in the wedge-shoes G, it being understood that the shanks of said bolts pass through openings provided therefor within the columns D.

It is thought that the operation will be sufficiently understood from the preceding description, attention being directed to the fact that, for each set of friction devices, there is one friction element in engagement with each friction surface of the shell and that two of said surfaces extend longitudinally and one transversely of the shell. It will further be noted that I employ the entire surface area of the shell in the generation of friction, thereby obtaining large friction wearing areas and enabling me to employ relatively blunt wedging angles without sacrifice of the desired high capacity.

I have herein shown and described what I now consider the preferred manner of carrying out the invention, but the same is merely illustrative and I contemplate all changes and modifications that come within the scope of the claims appended hereto.

I claim:

1. In a friction shock absorbing mechanism, the combination with a friction shell having opposed longitudinally extending friction surfaces and a transverse friction surface; of duplicate sets of friction elements, each set comprising a plurality of cooperable wedge-friction-shoes, there being one shoe of each set in engagement with each of said friction surfaces of the shell; a spring resistance; and means for actuating each set of friction elements.

2. In a friction shock absorbing mechanism, the combination with a friction shell having opposed longitudinally extending friction surfaces and a transverse friction surface; of duplicate sets of friction elements, each set comprising three wedge-friction-shoes, one movable longitudinally in one direction, one movable in the opposite direction, and one movable transversely of the shell; a spring resistance; and means for actuating one shoe of each of said sets in one direction, the remaining shoes of the sets being actuated therefrom.

3. In a friction shock absorbing mechanism, the combination with a friction shell of rectangular cross section having opposed longitudinally extending friction surfaces and a transverse friction surface at its inner end; of duplicate sets of wedge-friction-shoes cooperable with the shell, each set comprising three elements, one element cooperable with each of said friction surfaces of the shell; diagonally disposed pressure-transmitting plungers within the shell and each adapted to actuate one wedge-friction-shoe of a set; a follower disposed exteriorly of the shell and movable toward and from the shell and adapted to actuate said plungers; and a spring interposed between said follower and certain of the friction elements of the two sets.

4. In a friction shock absorbing mechanism, the combination with an outer follower; of a friction shell of rectangular cross section having opposed interior longitudinally extending friction surfaces and a transverse friction surface at its inner end; oppositely arranged sets of friction-wedge-shoes, each set comprising two outer oppositely movable friction shoes and an intermediate transversely movable friction shoe; diagonally disposed pressure-transmitting columns between said follower and one longitudinally movable shoe of each set; a spring follower within the shell and engageable at diagonally disposed corners thereof by the other longitudinally movable friction shoes of each set; and a spring resistance interposed between said spring follower and said outer follower.

5. In a friction shock absorbing mechanism, the combination with an outer follower; of a friction shell of rectangular cross section having opposed interior longitudinally extending friction surfaces and a transverse friction surface at its inner end; oppositely arranged sets of friction-wedge-shoes, each set comprising two outer oppositely movable friction shoes and an intermediate transversely movable friction shoe; diagonally disposed pressure-transmitting columns between said follower and one longitunally movable shoe of each set; a spring follower within the shell and engageable at diagonally disposed corners thereof by the other longitudinally movable friction shoes of each set; a spring resistance interposed between said spring follower and said outer follower; and means for retaining all of said elements in assembled relation.

In witness that I claim the foregoing I have hereunto subscribed my name this 7th day of July 1922.

JOHN F. O'CONNOR.

Witnesses:
 UNA C. GRIGSBY,
 ANN BAKER.